Nov. 18, 1969  T. G. BIXBY  3,478,829
STOP ROTATION MECHANISM ATTACHMENT
Filed April 29, 1968  2 Sheets-Sheet 1
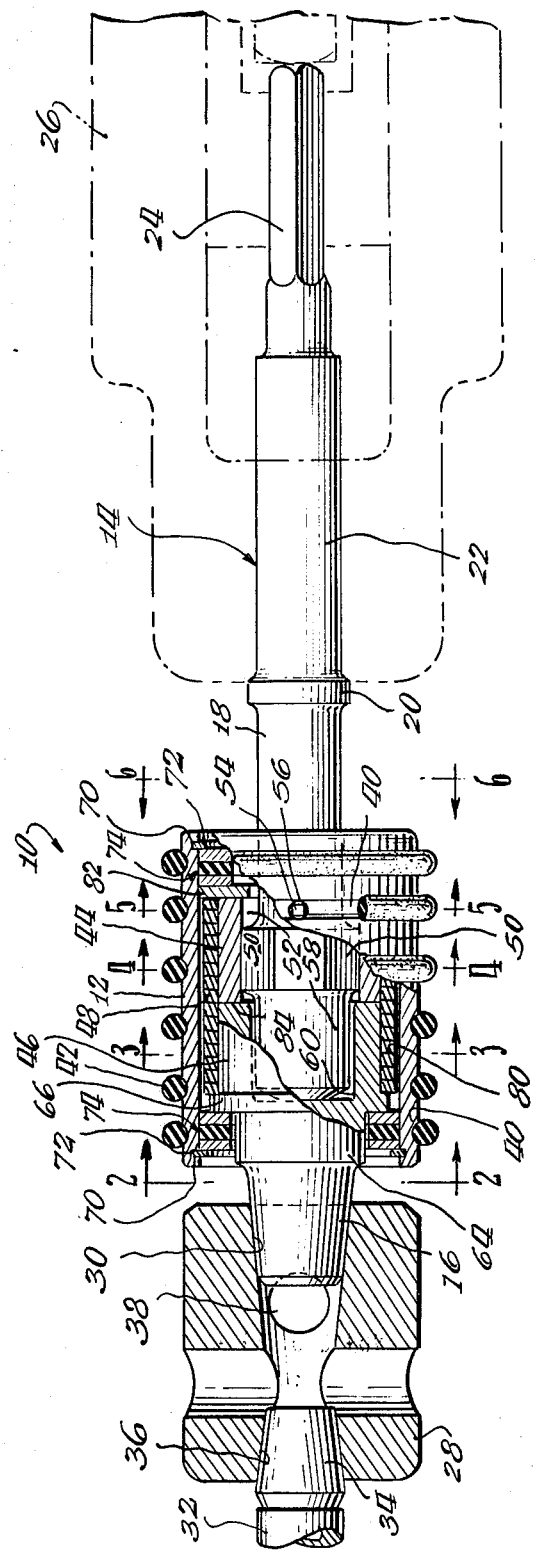
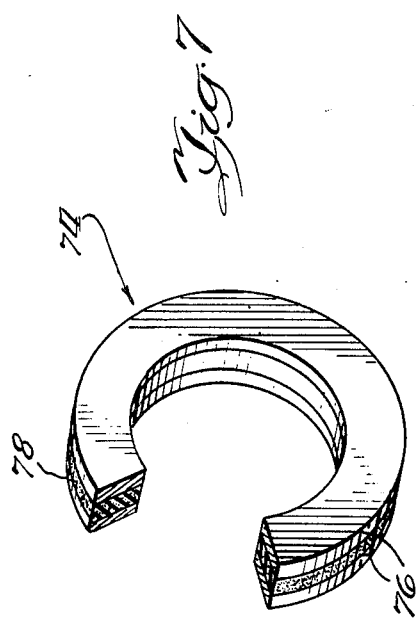
INVENTOR
Thomas G. Bixby
BY Silverman & Cass
ATTORNEYS

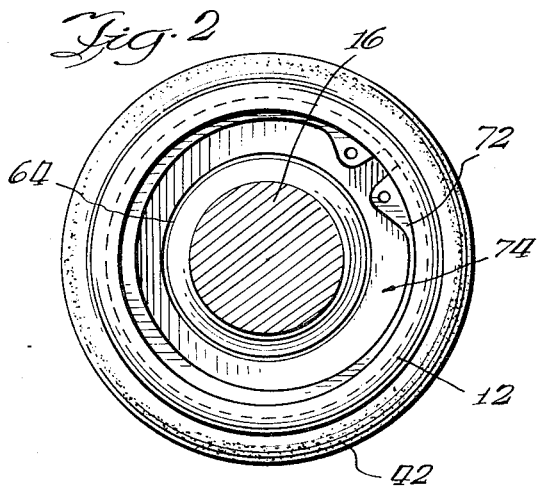
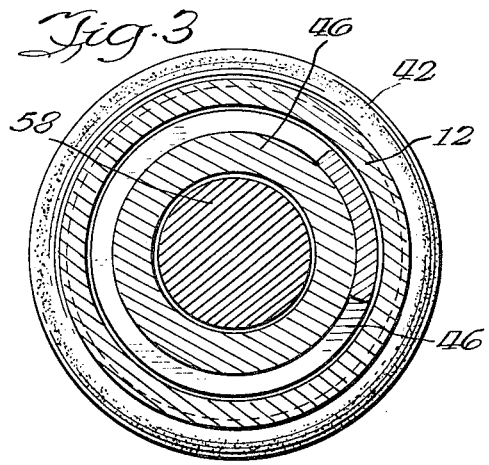
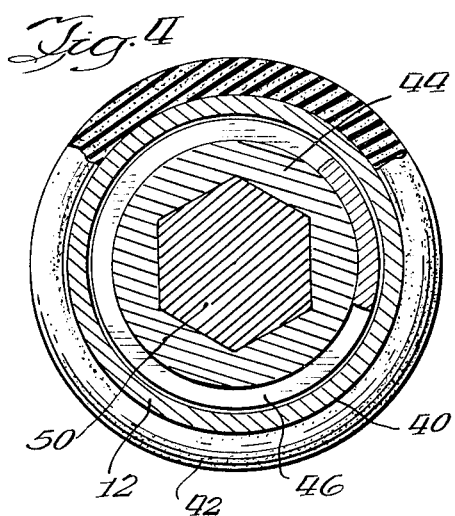
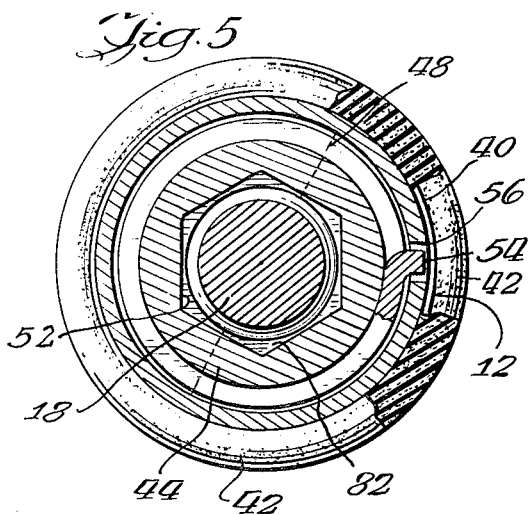
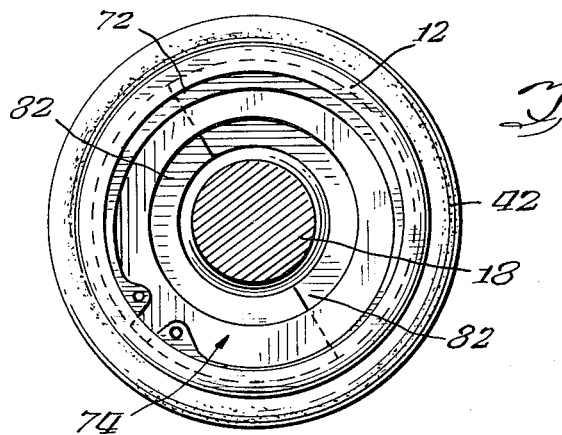

United States Patent Office 3,478,829
Patented Nov. 18, 1969

3,478,829
STOP ROTATION MECHANISM ATTACHMENT
Thomas G. Bixby, Valparaiso, Ind., assignor, by mesne assignments, to Phillips Drill Company, Inc., Michigan City, Ind., a corporation of Indiana
Filed Apr. 29, 1968, Ser. No. 725,009
Int. Cl. E21c *3/32;* B25d *9/00, 11/00*
U.S. Cl. 173—104                                 30 Claims

ABSTRACT OF THE DISCLOSURE

A stop rotation mechanism attachment to be mounted to a percussion hammer of the type which also rotates to enable the operator to stop the rotary action and permit the hammer to transmit only hammering action, as needed, for example in installing self-drilling anchors. The attachment is mounted in a housing having a shank extending from one end and a tool mounting adapter from the other end, the shank being of configuration to fit a conventional rotary percussion hammer, the tool mounting adapter being of a configuration to enable mounting an anchor installing chuck, for example. There being a clutch within the housing formed of a coiled spring contracted about two cylindrical frictional elements arranged end to end and coaxially within the spring. The rotary movement is transmitted from the shank to one frictional element, through the spring to the other frictional element and thence to the tool mounting adapter. The hammering force is transmitted through a conical nose and socket connection between the elements, also coaxial with the spring. The connection between the shank and the one frictional element causes rotation of the frictional element but is a slide connection so that no percussive force is transmitted to the first frictional element, but instead passes to the second frictional element through the nose and socket connection. The spring is retarded from rotating with the first friction member by grasping the housing in one's hand, the slippage causing the spring to be effectively rotated opposite its normal constricting direction, so that the coils open and disconnect the frictional elements from the spring, thereby permitting transmission of only percussive force.

The mechanism is held in assembly in the housing by sandwich assemblies locked into the ends, each assembly consisting of a sandwich of metal washers with a rubber layer vulcanized between to absorb shock during use. Lock rings in annular grooves back up the sandwich assemblies.

FIELD OF THE INVENTION

This invention relates generally to the field of percussive hammers and is primarily directed to the construction of a durable attachment which will increase the usefulness of a type of percussive tool that rotates while it hammers.

There are available at the present time many rotary percussion hammers that are used for a variety of purposes. Some of these have clutch arrangements to convert them from combined rotation and percussion to one of the other or both of these functions. Such hammers are expensive and complicated. These hammers are used, almost universally, in connection with the field of rock, stone, concrete and the like. They are intended for drilling holes, chipping, and so on. Accordingly, such hammers are massive, heavy, and consume considerable power. For a great many purposes, a preferred type of hammer is one which is constructed with continuous rotation and percussion occurring simultaneously, and without complex mechanisms for converting from this combination of functions. This relatively simple type of rotary percussion hammer is much smaller than the others mentioned, and obviously much more economical.

In recent years, self-drill anchors have been installed by rotary percussion hammers, and with less effort than using straight percussion with back and forth oscillation of the anchor-carrying chuck. In using such hammers, it is almost a necessity to stop the rotation for at least two short periods of time during the procedure of installing these anchors, and the invention is directed to the solution of this problem, that is, the stopping of rotation. The principal purpose of the invention is to provide an attachment for accomplishing the stopping of rotation for short periods of time so that the operator may use a small, economical and compact rotary percussion hammer, instead of a large and complicated one with built-in clutching arrangement.

As an aid in understanding the need for the invention and the manner in which the problems which existed before have been solved, it would be advisable to understand the construction of the self-drilling anchor and the prior methods of installing the same.

These anchors and the prior tools for installing the same are to some extent described in the following U.S. Patents 1,968,055, 1,996,121, 2,918,290 and 2,936,736.

The self-drilling anchor involved is a steel cylindrical member with hardened teeth formed at one end and a tapered break-off section at the other end. The interior is threaded and the toothed end is provided with external broaching grooves and axially extending slots. In the past, the tapered break-off section was wedged into an axial socket provided in a chuck, the chuck mounted on the end of a percussive hammer of the non-rotating variety, and the toothed end placed against a concrete or masonry surface at the location where it was desired to install the anchor. The hammer was operated, commencing to apply blows against the anchor through the chuck, and as this was occurring, the operator was oscillating the chuck back and forth through about 100° more or less, by means of a bail or handle pivotally secured to the chuck. This action caused the teeth to drill a hole in the concrete, with the debris working its way up the hollow of the anchor and out through a lateral passageway in the chuck connecting with the socket in which the tapered break-off end was secured.

After the hole was drilled up to the end of the chuck, the anchor was withdrawn and the hole cleaned out. A short hardened steel plug was inserted into the toothed end, the anchor re-inserted into the hole it drilled, and the hammer operated without oscillating the chuck. This action forced the plug into the bore of the anchor, splitting the toothed end and expanding it well within the hole, thereby permanently securing the anchor in place. The hammer was then given a sharp lateral strain, breaking off the tapered break-off end, leaving a permanent threaded steel socket in the concrete. The broken off end was then ejected from the chuck through the use of a drift pin.

The use of a rotary percussion hammer is not much different in installing these anchors, but it is obvious that when the anchor is to be started in the concrete, the rotation should be stopped. Otherwise, the anchor cannot be accurately placed. The rotation of the toothed end on the surface causes a "walking" which is practically impossible to control without some firm guide. Further, when the anchor is driven onto the plug, it is best that there be only axial blows to assure good expansion and a tight wedging engagement.

The invention contemplates a simple attachment that the workman inserts into his percussive hammer, the attachment having a shank specifically constructed to fit the particular hammer. These shapes are well-known, and when one purchases stone-working tools, the type of hammer is specified so that the proper shank dimensions and configuration can be obtained. The attachment has a protruding adapter which will fit into the end of a chuck exactly like the end of a conventional percussive hammer fits a self-drilling anchor mounting chuck. The body or housing of the attachment is a cylindrical structure easily grasped by the workman when it is necessary to do so. The workman inserts the anchor into the chuck, holds the teeth against the work surface, grasps the housing for a few seconds while throwing the switch or trigger to start the operation of the hammer. So long as he holds the housing, the hammer will not rotate the chuck, but will merely apply percussive force thereto. This short time is usually all that is needed to get the teeth of the anchor to start biting into the concrete and provide a cutout depression sufficient to prevent the "walking" that would occur if one tried to start the anchor with rotation in addition to percussion.

Thereafter, the workman releases the housing and may use both hands to guide and control the hammer. The rotation and percussion quickly cause the anchor to drill its hole. The anchor may be pulled out with the hammer still operating. Thereafter, the workman places the plug in the toothed end of the anchor, reinstalls the same in the drilled hole, and once more grasps the housing of the attachment while operating the hammer. The housing is held thus until the anchor is set, at which time the hammer is de-energized, the end broken off, the piece ejected, and the workman is ready to install another anchor.

It is pointed out that although the attachment has particular advantage in installing self-drill anchors, it is capable of readily being used wherever one is using a rotary percussion hammer with some kind of a tool, and it is desired to stop the rotary portion of the action from time to time to achieve only percussive action on the tool.

THE PRIOR ART

Reference may be made to a prior patent, U.S. 3,370,655 as typical of the prior art. The use of pins and cams, sliding sleeves and other coupling and uncoupling devices requiring some movement has been known. These structures are impractical for a variety of reasons, the primary one of which is the terrible beating that this type of device must withstand during continuous use. Pins break off, cams wear, coupling and uncoupling devices gall and do not mesh without stopping the operation of the hammer completely.

The use of spring clutches, per se, is well-known. The following U.S. patents show the use of springs for various purposes: 1,162,889, 2,105,330, 2,219,877, 2,510,653, 2,971,653, 2,971,394, 3,033,336 and 3,087,587.

SUMMARY OF THE INVENTION

The invention is directed primarily to the construction of a compact and durable attachment for use with a rotary percussion hammer to drive a tool which requires rotation to be stopped from time to time, as for example, to install a self-drilling anchor held in a chuck. The novelty lies in the simplicity and positive manner with which the attachment is operated, the user being required only to grasp the housing of the attachment in one hand to stop the rotation, and to release the housing to permit the rotation to continue, all of this without stopping the operation of the hammer.

The structure provided by the invention comprises a shank which goes into the hammer and protrudes from one end of the housing of the attachment, a three element clutch in the housing, and an adapter protruding from the other end of the housing to which the anchor mounting chuck is secured. The three clutch elements comprise a helical coiled spring having one end secured to the housing and having the other two elements coaxially engaged within its coils. The two engaged elements are cylindrical friction members, one being coupled to the shank through a sliding coupling which permits rotational force to be transmitted to the one friction member but no axial percussive force. The latter obtains because of a sliding connection. The second cylindrical friction member is integral with the adapter. There is an axial socket in the second friction member and a cylindrical nose on the first friction member, these two fitting with a slide fit, so that the percussive force is transmitted from the first to the second friction member at all times that the hammer is in operation, irrespective of whether the clutching action is occurring or not.

The action of the three element clutch depends upon the constricting action of a coiled spring if it is twisted in the direction tending to coil its convolutions tighter. In this case, the rotation of the first friction member is in this direction, so that the frictional engagement of the said member within the interior of the coil spring is sufficient to cause the spring to contract tightly upon this friction member. The constriction is transmitted through the spring to the second friction member and the spring tightens upon this as well, and the two friction members are hence tightly coupled together and rotate with the shank as the percussion is also transmitted.

Since the end of the spring is connected to the housing, the housing also rotates with the friction elements.

When the workman grasps the housing and holds it, he is resisting the relative movement between the spring and the first friction member. This is, in effect, similar to causng the spring to be twisted in the direction opposite the constricting direction, thereby causing it to open. There will be slipping between the first friction member and the spring, not applying an absolute twist in the opposite direction, but certainly transmitting sufficient torque to open the convolutions of the spring a bit. This prevents the spring from transmitting the rotary movement of the first friction member to the second friction member, with the result that only percussive force is applied to the adapter end.

It is preferred to have the spring apply the constricting force to the second friction member over a relatively large area of the surface of engagement of the spring with that second friction member, but it will be appreciated that it is immaterial that there be a release action between the spring and the second friction member. In other words, if the second friction member were secured to the spring just like the housing and did not have the ability to rotate relative thereto, it would not function as a clutch element, and it would be performing only the function of transmitting the rotational movement of the spring to the adapter. Such a structure would have to be robust and durable from a practical standpoint and should be designed to avoid spring breakage, jamming, and excessive heat generation. One proposed structure would be quite similar to that of the illustrated structure herein, except that there would be a lug formed on the end of the spring opposite that end secured to the housing, this first mentioned lug being directed radially inward and engaged in a suitable recess formed in the second friction member. This would give the benefits of clutching action and securement against relative rotation, but other structures can be built which use no clutching action whatsoever between the spring and the rotation transmitting element.

BRIEF DESCRIPTION OF THE DRAWINGS

FIG. 1 is a median sectional view through a stop rotation mechanism attachment for use in installing self-drilling anchors or the like, portions being shown in elevation and other portions being broken away to show the details thereof.

FIGS. 2, 3, 4, 5 and 6 are sectional views taken through the attachment of FIG. 1 along the planes 2—2, 3—3, FIG. 7 is a perspective view of the combined retaining and shock absorbing assembly of the attachment, with a portion broken away.

DESCRIPTION OF THE PREFERRED EMBODIMENT

The attachment of the invention is designated by the reference character 10, and it will be seen that same comprises a housing 12 to be grasped by the workman, having a shank adapter 14 protruding from the right hand end and a driven adapter 16 protruding from the left hand end.

The shank adapter 14 is an elongate steel member which is here shown to have a cylindrical portion 18 immediately adjacent the housing 12, a collar portion 20, another cylindrical portion 22, and a hexagonal or square end section 24. The configuration of the shank comprising the portions 18, 20, 22 and 24 is a matter of design to enable the shank adapter 14 to fit into a suitable rotary percussion hammer. It will vary from hammer to hammer, and the manufacturer of the attachment 10 will have a different design of shank adapter 14 for the different kinds of hammers for which he sells the attachment. In FIG. 1, a symbolic hammer is shown at 26 in generally phantom cross section. One must bear in mind that the hammer 26 applies percussive and rotary force to the shank 14.

The adapter 16 is shown providing a tapered nose, but this is also a matter of design. In the illustration, a chuck 28 is mounted to the adapter 16, the nose fitting into a suitable conical socket 30 formed in the chuck. The opposite end of the chuck has a self-drilling anchor 32 mounted thereto, the break-off head 34 being wedged into a tapered socket 36 formed co-axially of the chuck, the debris discharge passageway being shown at 38. It is through this same passageway that the drift pin will be introduced to eject the broken off end when the anchor 32 has been set.

If any other kind of fastener is to be installed, or some other kind of tool operated, the construction of the driven adapter 16 may be different. It may not even be a conical tapered nose. For purposes of claiming the invention, this structure 16 is called a coupling member in one case and a tool connecting adapter in another instance. As for the shank 14, it is called a coupling member in one instance and a shank adapter in another instance.

On its exterior surface, the housing 12 may be provided with any form of friction means to enable the workman to grasp it, considering that the housing may be rotating while this is done. In the structure illustrated, there are formed annular grooves 40, and a plurality of elastic rubber rings 42 are mounted in these grooves. The rubber rings 42 help the workman obtain a purchase on the housing, insulate his hand from the metal surface which may be relatively hot, and are easily replaced if they become worn.

The housing 12 has three clutch elements operatively disposed within its interior, these elements being a first friction clutch element 44, a second friction clutch element 46, and the sleeve clutch element 48.

The purpose of these clutch elements is to transmit the rotation of the shank 14 to the adapter 16, and while doing so also to transmit the percussion of the shank 14 to the adapter independently of the rotation transmission. These functions are performed as explained hereinafter.

For transmitting rotation, the shank 14 is coupled to the element 44 by means of a sliding connection through the hexagonal end 50 engaged in a hexagonally conforming bore 52 formed in the element 44 so that rotation of the shank rotates the element 44. The outer surface of the element 44 is cylindrical and engaged within the cylindrical interior of the sleeve clutch element 48, which is secured to the housing by means of a projection 54 engaging a recess 56 in the housing. When the first friction clutch element 44 rotates, it tends to twist the sleeve clutch element 48, which as will be explained is a coil spring, in a direction tending to cause it to contract and tighten. As it does this, it also contracts and tightens on the exterior cylindrical surface of the friction clutch element 46, and since this latter is integral with the adapter 16 in the construction illustrated, the adapter 16 rotates.

For transmitting percussive movement, the lefthand end of the shank 14 has a cylindrical nose 58 which engages within a socket 60 formed in the axial end of the friction clutch element 46. These two cooperating structures are capable of rotating one relative to the other, and hence they are not affected whether the shank 14 is rotating or not. They are close axially, however, so that axial movement of the shank 14 will cause percussive force to be applied to the element 46 and hence be transmitted to the adapter nose 16.

When the workman grasps the housing 12, it is prevented from rotating with the element 44 since that element applies sufficient frictional engagement to the inner surface of the sleeve clutch element 48 to cause it to tend to twist in the direction opposite that described, thereby expanding. This slippage continues so long as the workman holds the housing 12. The friction clutch element 46 stops rotating as long as the housing and the sleeve clutch element 48 are not rotating, and indeed, the spring 48 could as well be connected to the element 46, in which case it would serve primarily as a rotation transmitting element without clutch action, or with only auxiliary clutch action.

The element 44 is in the form of a bushing having an external cylindrical surface and an interior hexagonal surface 52. The engaging hexagonal end 50 is formed on the left hand end of the cylindrical part 18 of the shank 14, and it will be seen that the hexagonal end 50 is of lesser axial length than the bushing 44 so that there is allowance for the axial reciprocation produced by the percussive action of the hammer. The cylindrical nose 58 is integral with the shank 14.

The friction clutch element 46 is a portion of a larger member that includes the adapter 16, an interconnected extension 64 and a flange 66. This one member, including the cutch element 46 and the adapter 16 could be formed of several pieces connected together.

The outer cylindrical surfaces of the friction clutch elements 44 and 46 are coaxial and have the same diameter, and these two members engage one another axially endwise. They conform in their curvature to the interior cylindrical surface of the sleeve clutch element 48. As mentioned, this element is a coiled spring, the coils being wound quite close together and preferably being rectangular in cross section so that the interior cylindrical surface presents a large frictional area to the clutch elements 44 and 46. The normal direction of the coiling of the spring 48 is chosen looking from right to left in FIG. 1, to be clockwise, to conform to the direction of normal rotation of practically all drills and rotary percussion hammers. If one would engage the spring at its right hand end and try to twist it further, holding the left hand end against such rotation, the effect would be to cause the convolutions to get tighter and thereby contract. This is the action which occurs when the friction clutch element 44 is rotated clockwise, the inertia of the spring and the engagement of the left hand end with the element 46 providing sufficient resistance to twisting so that the element 44 binds and twists tighter. The housing 12 is connected to the spring and rotates with it, having no effect when the conditions are normal, that is, nothing is done to prevent rotation of the housing.

It will be obvious that holding the housing causes the right hand end to resist coiling of the spring so that in effect the spring is being twisted in the opposite or counterclockwise direction and it opens its convolutions, releasing the friction clutch element 44. The element 46 does not rotate because the spring 48 is being held against rotation.

The invention includes provision for keeping the device in assembly and for ensuring long life and durability. Starting at the left hand end, there is an annular groove 70 within which an expandable lock ring 72 is installed. This can be any of the split or spring rings well-known in the art. Next is an assembly 74 best illustrated in FIG. 7 comprising a combination retainer and shock absorber. The assembly 74 is formed of two steel washers 76 having a rubber washer 78 sandwiched therebetween. This rubber layer is vulcanized in place. Next is the flange 66 of the integral member forming the clutch element 46 and the adapter 16. The flange 66 serves as a spacer, separating the retainer assembly 74 and the left hand end of the spring 48. The spring is closely engaged over the friction clutch elements and is disposed in a spring chamber 80 with a small amount of clearance so that during normal operation there is sufficient space for the spring to expand when it declutches from the friction elements.

At the right of the spring is a ring 82 which is normally made up of two halves so that the larger hexagonal section 50 may be inserted into the housing, and so that the assembled housing will not pull off the shank 14 when withdrawing the anchor 32 from a drilled hole, for example. Note that the inner diameter of the ring 82 is less than the outer dimensions of hexagonal section 50. To the right of the ring 82 is another assembly 74, another annular groove 70 and another lock ring 72.

The assembled attachment 10 provides an extremely compact and safe device. There are no pins or levers or screws protruding, due to the method of locking everything in place by the rings 72. Note also that these rings are disposed axially inward of the ends of the cylindrical housing 12 so that there is nothing to catch on clothing or fingers at either end. The combined retainer and shock absorber assemblies 74 are effective to keep the shock of the percussive forces from destroying the attachment. As previously mentioned, the attachment takes a rather heavy beating during use, and this produces powerful shock waves travelling to each end of the mechanism. The end faces of the two friction elements, along the plane 84 tend to bounce away from one another. Since the spring 48 is very closely coiled, and is being contracted during normal use, the end faces at the plane 84 must be kept together at all times, or else a coil will fall into the space and jam the mechanism, causing severe damage. The only way to prevent this is to have a minimum of axial movement, requiring retainer means which are fairly tight. It was found that almost any type of washers or annular members used at the present location of the assemblies 74 would not stand up, but would break due to the repeated shock. The assemblies 74 solved this problem by providing the strength of the outer steel washers 76, and the interior elastic layer to absorb shock without yielding to any great extent so that the space at the plane 84 did not open up. The vulcanizing of the layer 78 prevented excessive wear and extrusion of the elastic layer.

The actual retaining of the assembly of the interior clutch and coupling parts is provided by the assemblies 74 and the rings 70, but instead of rings 70 other locking means could be used with the assemblies 74.

It will be noted that the end 54 of the spring 48 which extends into the passageway 56 is preferably covered by one of the rubber rings 42.

A minimum of debris and dust will enter the housing 12, and due to the rugged nature of the mechanism and the type of clutch action, any dust that does enter will have less effect than in the case of other mechanisms which depend upon close fitting and accurately sliding connections. If desired, conventional dust and/or lubricant seals can be installed in the ends of the housing 12.

What it is desired to secure by Letters Patent of the United States is:

I claim:

1. A stop rotation mechanism attachment for use with a percussion hammer having rotary and axially percussive forces continuously applied by said hammer and adapted for installing self-drilling anchors and the like, said attachment comprising:
   (A) a housing having a twistable, contractile sleeve clutch element mounted therein and connected thereto, and having means on the exterior thereof to enable manual grasping thereof,
   (B) a first friction clutch element adapted to be engaged with or disengaged from said sleeve clutch element and having a first coupling member connected with said element for securement to a rotary percussion hammer, the connection between said first friction clutch element and first coupling member being sliding and rotary,
   (C) a rotation transmitting element engaged with said sleeve clutch element and having a second coupling member connected therewith for securement of a tool thereto to enable the tool to be driven, and
   (D) an independently operable, axially percussive force transmitting connection between the friction clutch element and rotation transmitting element,
      said sleeve clutch element adapted to contract about said friction clutch element normally when said first coupling member is rotated in one direction by a rotary percussion hammer due to frictional twisting and contracting of said sleeve clutch element by transfer of rotary motion through said first friction clutch element whereby to transmit percussive and rotary force to said second coupling member, and
      said sleeve clutch element adapted to expand and release said friction clutch element when said housing is grasped and prevented from rotating with said first friction clutch element due to relative twisting of said sleeve clutch element in an opposite direction, whereby to transmit only percussive force to said second coupling member through said percussive force transmitting connection.

2. The stop rotation mechanism attachment as claimed in claim 1 in which said rotation transmitting element is a second friction clutch element, and the contraction of said sleeve clutch element acts upon said second friction clutch element as well as said first friction clutch element.

3. The stop rotation mechanism attachment as claimed in claim 1 in which said sleeve clutch element comprises a coiled helical spring.

4. The stop rotation mechanism attachment as claimed in claim 2 in which said sleeve clutch element comprises a coiled helical spring.

5. The stop rotation mechanism attachment as claimed in claim 3 in which said friction clutch element comprises a cylindrical surface on the interior of said spring and coaxial therewith.

6. The stop rotation mechanism as claimed in claim 4 in which said friction clutch elements comprise cylindrical surfaces on the interior of said spring and coaxial therewith.

7. The stop rotation mechanism attachment as claimed in claim 1 in which said clutch elements and rotation transmitting elements are all disposed within said housing with the first coupling member extending from one end of said housing and the second coupling member extending from the other, and there being means at said ends for retaining all said elements assembled within said housing.

8. The stop rotation mechanism attachment as claimed in claim 2 in which said clutch elements are disposed within said housing with the coupling members extending out of respectively opposite ends of said housing, and there being means at said ends for retaining all of said elements assembled within said housing.

9. The stop rotation mechanism attachment as claimed in claim 7 in which shock absorbing means are provided at the said ends of said housing.

10. The stop rotation mechanism attachment as claimed in claim 8 in which shock absorbing means are provided as the said ends of said housing.

11. The stop rotation mechanism attachment as claimed in claim 9 in which said retaining means and shock absorbing means at respective ends of said housing are combined.

12. The stop rotation mechanism attachment as claimed in claim 10 in which said retaining means and shock absorbing means at respective ends of said housing are combined.

13. The stop rotation mechanism attachment as claimed in claim 1 in which said housing is cylindrical and has open ends and the clutch elements and rotation transmitting elements are assembled within said housing with the coupling members extending respectively axially out of opposite ends, and in which there are assembly retaining and shock absorbing means at opposite ends of the housing.

14. The stop rotation mechanism attachment as claimed in claim 2 in which said housing is cylindrical and has open ends and the clutch elements are assembled within said housing with the coupling members extending respectively axially out of opposite ends, and in which there are assembly retaining and shock absorbing means at opposite ends of the housing.

15. The stop rotation mechanism attachment as claimed in claim 13 in which said assembling retaining and shock absorbing means include a sandwich assembly of an annular layer of elastic material between two annular layers of metal.

16. The stop rotation mechanism attachment as claimed in claim 14 in which said assembly retaining and shock absorbing means include a sandwich assembly of an annular layer of elastic material between two layers of metal.

17. The stop rotation mechanism attachment as claimed in claim 15 in which layer of elastic material is rubber-like in composition and is substantially permanently adhered to said two annular layers.

18. The stop rotation mechanism attachment as claimed in claim 16 in which said layer of elastic material is rubber-like in composition and is substantially permanently adhered to said two annular layers.

19. The stop rotation mechanism attachment as claimed in claim 3 in which the coiled helical spring has a projection formed at one end thereof, and said housing has a passageway therein engaged by said projection to provide the connection between the housing and spring.

20. The stop rotation mechanism attachment as claimed in claim 4 in which the coiled helical spring has a projection formed at one end thereof, and said housing has a passageway therein engaged by said projection to provide the connection between the housing and the spring.

21. The stop rotation mechanism attachment as claimed in claim 7 in which said retaining means comprise an internal annular groove formed adjacent each end of said housing and a locking ring removably engaged in each groove.

22. The stop rotation mechanism attachment as claimed in claim 8 in which said retaining means comprise an internal annular groove formed adjacent each end of said housing and a locking ring removably engaged in each groove.

23. A stop rotation mechanism attachment as claimed in claim 1 in which said percussive force transmitting connection comprises an axial annular socket in one of said clutch and rotation transmitting elements, and an axially extending conforming annular nose in the other of said clutch and rotation transmitting elements.

24. A stop rotation mechanism attachment as claimed in claim 2 in which said percussive force transmitting connection comprises an axial annular socket in one of said first and second friction clutch elements and an axially extending conforming annular nose in the other of said friction clutch elements.

25. A stop rotation mechanism attachment as claimed in claim 1 in which said sliding and rotary connection comprises an axially extending non-circular socket in one of said first friction clutch element and said first coupling member, and an axially extending conforming male non-circular formation on the other of said first friction clutch element and said first coupling member.

26. A stop rotation mechanism attachment as claimed in claim 2 in which said sliding and rotary connection comprises an axially extending non-circular cross-section socket in one of said first friction clutch element and said first coupling member, and an axially extending conforming male non-circular cross-section formation on the other of said first friction clutch element and said first coupling member.

27. A stop rotation mechanism attachment for use with a percussion hammer having rotary and axially percussive forces continuously applied by said hammer and adapted for installing self-drilling anchors and the like, said attachment comprising:
  (A) a shank adapter of a construction to connect same at one end thereof into operative connection with a percussion hammer and having a driver clutch element at the second end thereof,
    (i) said driver clutch element having an external annular friction surface and
    (ii) an internal connection with said second end of said shank adapter of the type permitting relative sliding movement between driver clutch element and said end while transmitting rotary movement of said second end to said driver clutch element,
  (B) a tool connecting adapter adapted to have a tool coupled thereto at one end thereof and having a second driven clutch element at the second end thereof,
    (i) said driven clutch element having an external annular friction surface and
    (ii) an axial percussion force transmitting connection between said second end of said tool connecting adapter and said second end of said shank adapter, said connection being of the type permitting transfer of axial movement of said shank adapter to said tool connecting adapter without transmitting rotary movement,
  (C) a sleeve-like connector clutch element arranged coaxially of both external annular friction surfaces and having an internal frictional engagement with both surfaces, said connector clutch element comprising
    (i) a contractile resilient convolute member wound in a direction to cause a decrease in the diameter thereof with frictional securement of said annular surfaces if twisted in the one direction while tending to cause an increase in diameter with release of said surfaces if twisted in the opposite direction,
    (ii) the said frictional engagement being between the adjacent convolutions of said convolute member and said annular surfaces, and the interior of said convolutions substantially conforming in configuration to both annular surfaces, and
    (iii) attaching means formed at one end of said connector clutch element, and
  (D) a housing for confining all of said clutch elements,
    (i) said housing comprising a sleeve having said attaching means of said connector clutch element secured thereto so that rotation and twisting of the connector clutch element may be controlled by grasping or releasing said sleeve, (ii) said housing being open at opposite ends thereof and having said shank adapter extending through and secured in one end and the tool connecting adapter extending through and secured in the second end.

28. The stop rotation mechanism attachment as claimed in claim 27 in which the connector clutch element comprises a helical coiled cylindrical spring and the annular friction surfaces are cylindrical of substantially the same diameter as the interior surface of the spring, said interior surface being formed by said interior of said convolutions.

29. The stop rotation mechanism attachment as claimed in claim 27 in which said tool connecting adapter and driven clutch element are integral.

30. The stop rotation mechanism as claimed in claim 29 in which said connection between said second ends of each of tool connecting adapter and shank adapter comprise a cylindrical socket in one of said second ends and a reciprocable cylindrical nose formation in the other of said second ends.

References Cited

UNITED STATES PATENTS

| | | | |
|---|---|---|---|
| 2,539,610 | 1/1951 | Bunch | 192—81 X |
| 2,936,736 | 5/1960 | Werstein | 173—104 X |
| 3,104,745 | 9/1963 | Wipke | 192—81 |
| 3,171,523 | 3/1965 | Shoquist | 192—81 |
| 3,181,669 | 5/1965 | Kunde | 192—81 |
| 3,197,002 | 7/1965 | Cooper | 192—81 |
| 3,370,655 | 2/1968 | Chromy | 173—104 |

NILE C. BYERS, JR., Primary Examiner

U.S. Cl. X.R.

192—81